US006357873B1

(12) United States Patent
Spindelbalker

(10) Patent No.: US 6,357,873 B1
(45) Date of Patent: Mar. 19, 2002

(54) POSITIVE-FIT CONNECTION BETWEEN A METALLIC LINK AND AN INJECTION-MOULDED PLASTIC PART NOTABLY FOR SPECTACLES

(75) Inventor: Rupert Spindelbalker, Puchenau (AT)

(73) Assignee: Silhouette International Schmied GmbH & Co. KG, Linz (AT)

( * ) Notice: Subject to any disclaimer, the term of this patent is extended or adjusted under 35 U.S.C. 154(b) by 0 days.

(21) Appl. No.: 09/763,738

(22) PCT Filed: Aug. 19, 1999

(86) PCT No.: PCT/AT99/00204

§ 371 Date: Feb. 26, 2001

§ 102(e) Date: Feb. 26, 2001

(87) PCT Pub. No.: WO00/12905

PCT Pub. Date: Mar. 9, 2000

(30) Foreign Application Priority Data

Aug. 31, 1998 (AT) .......................................... 1478/98

(51) Int. Cl.[7] .............................................. G02C 5/00

(52) U.S. Cl. ........................ 351/149; 351/133; 351/140

(58) Field of Search ................................ 351/140, 143, 351/144, 147, 149, 133

(56) References Cited

U.S. PATENT DOCUMENTS 1,274,870 A * 8/1918 Golding ...................... 351/149
3,661,406 A 5/1972 Mele .................. 287/189.36 F
4,810,585 A 3/1989 Oda et al. ................... 428/469
5,367,344 A 11/1994 Fuchs .......................... 351/41

FOREIGN PATENT DOCUMENTS

| | | | |
|---|---|---|---|
| DE | 24 23 334 | 11/1975 | |
| DE | 24 60 878 | 6/1976 | |
| DE | 4239312 A1 * | 5/1994 | ................ 351/143 |
| EP | 0 067 373 | 4/1987 | |
| EP | 0450225 A2 * | 10/1991 | ................ 351/143 |
| GB | 881 874 | 11/1961 | |

* cited by examiner

*Primary Examiner*—Huy Mai
(74) *Attorney, Agent, or Firm*—Collard & Roe, P.C.

(57) ABSTRACT

In a positive-locking connection between a metallic bridge and a moulded article which is injection-moulded from plastic, in particular for spectacles, one end of the bridge engages in the moulded article. In order to provide advantageous constructional conditions, it is proposed that the moulded article form a plug-in receiving means with the engaging end of the bridge which is provided with a wave-like snap-in profiling and can be inserted into the plug-in receiving means under a substantially elastic deformation of a wall profiling of the receiving means which is shaped according to the snap-in profiling of the bridge end.

6 Claims, 4 Drawing Sheets

6 5 4 2
3
1
6 5

10
9
8
2
4
5
1
6
7
3

8
2
4
6
5
3
1
7

11
12
3
10
VI
VI
8
1
13
2

8
3
12
4
6
13
10
2
1
11
5

POSITIVE-FIT CONNECTION BETWEEN A METALLIC LINK AND AN INJECTION-MOULDED PLASTIC PART NOTABLY FOR SPECTACLES

CROSS REFERENCE TO RELATED APPLICATIONS

Applicants claim priority under 35 U.S.C. §119 of Austrian Application No. A 1478/98, filed on Aug. 31, 1998. Applicants also claim priority under 35 U.S.C. §120 of PCT/AT99/00204, filed on Aug. 19, 1999. The international application under PCT article 21 (2) was not published in English.

TECHNICAL FIELD

The invention relates to a positive-locking connection between a metallic bridge and a moulded article which is injection-moulded from plastic, in particular for spectacles, with one end of the bridge engaging in the moulded article.

STATE OF THE ART

In order to connect the metallic cheek piece carrying the side joint with the plastic frame forming the frame for the glasses in such a way that this connection can be sufficiently loaded, the metallic cheek piece is inserted with its engaging end into the injection mould for the spectacle frame, so that the plastic of the frame is injection-moulded around the engaging end of the cheek piece. Due to the unavoidable tolerances, it may occur that there are difficulties in sealing the leadthrough of the metallic cheek piece through the injection mould, so that in the visible zone of the transition from the plastic frame to the metallic cheek piece it is necessary to rework the cheek piece. Moreover, it may occur that the surface of the frequently refined metallic parts is damaged by the insertion into the injection mould. An additional factor is that the insertion of the metallic parts into the injection mould can hardly be automated.

SUMMARY OF THE INVENTION

The invention is thus based on the object of providing a positive-locking connection between a metallic bridge and a moulded article of the kind mentioned above which is injection-moulded from plastic, in particular for spectacles, so that a connection with sufficient loading capacity can be produced with little effort without having to re-work the metallic bridge. Moreover, the danger of any damage to the surface of the metallic bridge is to be avoided.

This object is achieved by the invention in such a way that the moulded article forms a plug-in receiving means for the engaging end of the bridge which is provided with a wave-shaped snap-in profiling which, with a substantially elastic deformation of a wall profiling of the plug-in receiving means arranged according to the snap-in profiling of the bridge end, can be inserted into the same.

As a result of the plug-in connection between the moulded article made of injection-moulded plastic and the metallic bridge, all other disadvantages in connection with the insertion of said bridge into an injection mould are avoided. Conventional plug-in connections are unsuitable for such use due to the relatively high load requirements which are placed on spectacle frames. These load requirements can only be fulfilled by a wall profiling of the plug-in receiving means according to the snap-in profiling of the engaging end of the bridge when during the insertion of the engaging end of the bridge into the plug-in receiving means its wall profiling is deformed substantially only elastically by the projecting wave crests of the snap-in profiling of the bridge end, so that after the introduction of the bridge end into the plug-in receiving means the wave crests of the bridge end will engage in the wave troughs of the wall profiling of the plug-in receiving means without causing any local stresses which could lead to the formation of fissures in the zone of the wall profiling of the plug-in receiving means. The positive-locking connection produced in this manner between the metallic bridge and the moulded article which is injection-moulded from plastic is surprisingly capable of permanently withstanding all loads which occur in spectacles in particular. Concerning the connection load, conditions can certainly be obtained which are comparable with bridges which are injected into plastic. With the omission of injection-moulding around the bridge it is also possible to simplify storing because connections only need to be produced when needed and not during the production of the moulded bodies.

By influencing the shape of the wave-shaped snap-in profiling of the bridge end or the wall profiling of the plug-in receiving means, it is possible to take into account different load requirements. As a result, advantageous pre-conditions for a connection in accordance with the invention will be obtained when the snap-in profiling of the engaging end of the bridge consists of an undulation of mutually oppositely disposed bridge surfaces. Said undulation of the bridge surfaces can extend symmetrically with respect to the central plane of the bridge, so that thick places of the bridge are formed in the zone of the wave crests and thin places of the bridge are formed in the wave troughs. The symmetrical arrangement of the snap-in profiling to mutually oppositely disposed bridge surfaces makes the connection independent of any rotational position of the metallic bridge because corresponding profile outline shapes are obtained for the engaging end which is rotated by 180° about its longitudinal axis. If, on the other hand, in another embodiment, the engaging end of the bridge is bent back and forth in a wave-like manner to form the snap-in profiling, these symmetrical conditions are left, which leads to a distinction between left and right spectacle parts.

The positive-locking connection between a metallic bridge and a moulded article which is injection-moulded from plastic allows new spectacle designs because the plug-in connection can also be made as late as during the assembly. It becomes possible for example to advantageously produce spectacle joints which consist of a cylindrical joint body which is rotatably held in the bearing bush of the cheek piece and which is connected with the wire side shaft. Since the wire side shaft of the spectacle is guided through a circumferential slot of the bearing bush and the cylindrical joint body can only be inserted axially into the bearing bush, it was necessary that the circumferential slot was provided with an axial leadthrough opening for the wire side shaft in order to enable the insertion of the wire side shaft connected with the joint body into the side joint. If the bearing body which is produced as a moulded part made of injection-moulded plastic forms a plug-in receiving means in accordance with the invention for the engaging end of the wire side shaft and if the engaging end of the wire side shaft is provided with a respective snap-in profiling, the engaging end of the wire side shaft, following the axial insertion of the joint body into the bearing bush, can be inserted from the outside through the circumferential slot of the bearing bush in the radial direction into the plug-in receiving means in order to ensure the required positive-locking connection. In this way, an axial retention of the joint body in the bearing bush is achieved which is effective over the entire swivelling range of the joint, namely with the help of the wire side shaft which is held in the circumferential slot of the bearing bush against a single displacement.

As has already been explained above, it is of relevant importance for the permanent resilience of the positive-locking connection that the wave-like snap-in profiling of the bridge end corresponds to the wall profiling of the plug-in receiving means, so that in the case of engagement no locally limited tensions will occur in the moulded article which could lead to an overload of the plastic although the connection stress remains within a permissible range. In order to enable the simple production of a respective plug-in receiving means for the engaging end of the metallic bridge which is provided with a wave-like snap-in profiling, an injection mould with a core for the plug-in receiving means can be provided for the moulded article which has the shape of the engaging end of the bridge. Since a moulded article with such a plug-in receiving means cannot be removed from the mould with ease and the elastic behaviour of the moulded article still must allow the insertion of the engaging end of the metallic bridge into the plug-in receiving means, the core, following the curing of the moulded article, can be pulled out by using the elastic behaviour of the wall profiling of the plug-in receiving means from the moulded article under elastic deformation of the wall profiling, so that advantageous constructional conditions for the injection moulds and simple mould removal conditions are obtained for the respective moulded articles which are produced with such injection moulds.

SHORT DESCRIPTION OF THE DRAWINGS

The subject matter of the invention is shown in the drawings by way of example, wherein.

EMBODIMENTS OF THE INVENTION

Figure 1:
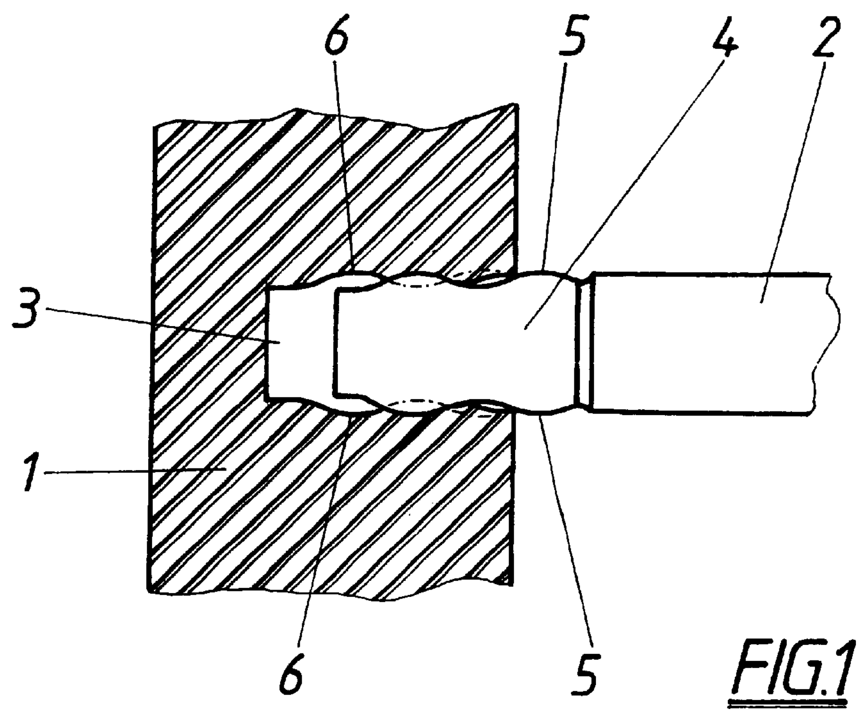
FIG. 1 shows in a schematic axial sectional view a moulded article which is injection-moulded from plastic, comprising a plug-in receiving means in accordance with the invention for a metallic bridge whose engaging end engages only partly in the plug-in receiving means.
Figure 2:
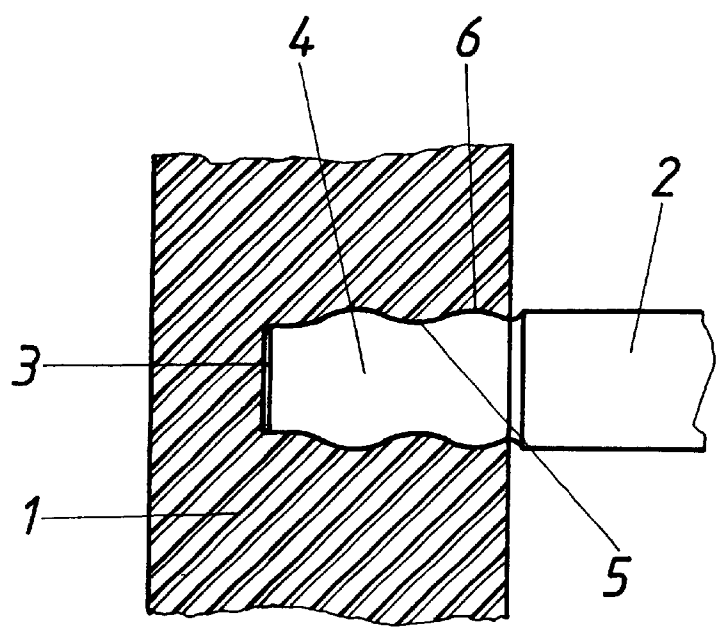
FIG. 2 shows a representation corresponding to FIG. 1 of the moulded article with a completely inserted bridge.

As is shown in FIGS. 1 and 2, the moulded article 1, which is injection-moulded from plastic, is provided with a plug-in receiving means 3 for the engaging end 4 of bridge 2 for the purpose of connection with a metallic bridge 2. Said plug-in receiving means 3 is provided with a rectangular cross-section-like engaging end 4, with said engaging end 4 being arranged on mutually opposite bridge surfaces with a wave-like snap-in profiling 5. Since the plug-in receiving means 3 is provided with a wall profiling 6 which corresponds to the snap-in profiling 5, the engaging end 4 of the bridge 2 which is inserted into the plug-in receiving means 3 is connected in a positive-locking way with the moulded article 1, as is shown in FIG. 2. During the insertion of the engaging end 4 into the plug-in receiving means 3 it is necessary that the moulded article 1 allows sufficient elastic deformation in the zone of the wall profiling 6 in order to enable the wave crests of the snap-in profiling 5 of bridge end 4 to move past the wave crests of the wall profiling 6 of the plug-in receiving means 3. FIG. 1 shows said insertion of the engaging end 4 into the plug-in receiving means 3 with the required elastic deformation of the wall profiling 6, with the normal progress of the wall profiling 6 being shown with the dot-dash line. In the engaging position according to FIG. 2, the tensile and pressure forces which occur in the case of a tensile or pressure load of the metallic bridge 2 are transmitted via the flanks of the wave-like snap-in profiling 5 onto the adjacent flanks of the wall profiling 6 of the plug-in receiving means 3, which occurs by avoiding any local load peaks, thus producing a positive permanent connection. The torsionally rigid fixing of the bridge 2 towards the moulded article 1 is maintained by the rectangular shape of the cross section of the engaging end 4 or of the plug-in receiving means 3. Since the tensile or pressure loads of the bridge 2 are transmitted via several flanks of the profiling 5 or 6 onto the moulded article 1, a distribution of load is achieved which, on providing a respective number of undulations, will prevent any local overload of the moulded article 1.

In order to enable the production of a moulded article 1 with a wall profiling 6 of the plug-in receiving means 3 in a simple manner, a core according to the engaging end 4 is used for the injection mould, which core, following the curing of the moulded article 1, can be pulled out of the plug-in receiving means 3 under elastic deformation of the wall profiling 6. Similar conditions occur during this mould removal process as are shown in FIG. 1. Instead of inserting a bridge 2 into the plug-in receiving means 3, only a mould core is pulled out of the plug-in receiving means 3.

Figure 3:
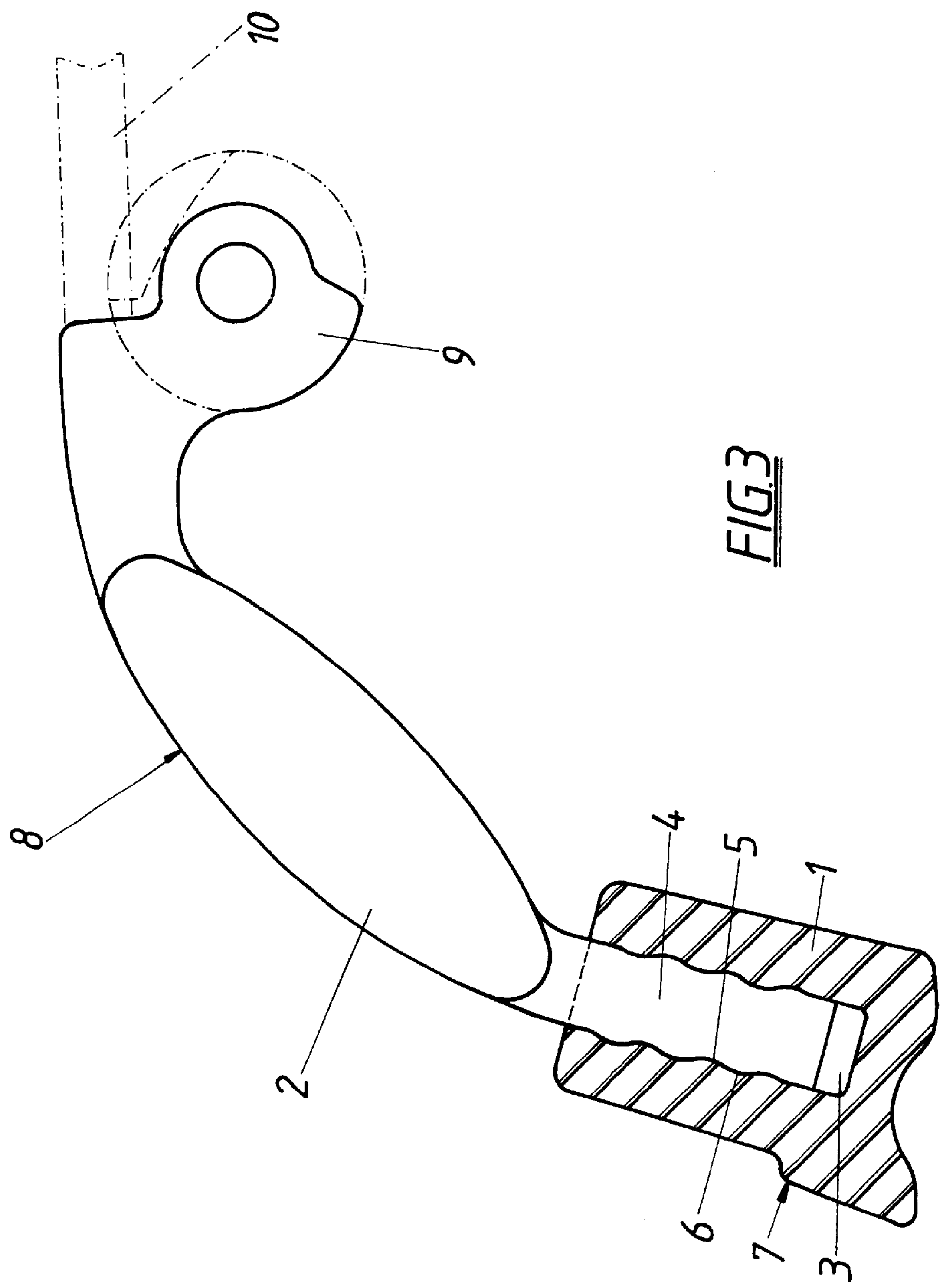
FIG. 3 shows an axial sectional view of a connection in accordance with the invention between a spectacle frame and cheeks carrying the side joint.

The plug-in connection as explained in FIGS. 1 and 2 can be used wherever a metallic bridge 2 is to be connected with a moulded article 1 made of injection-moulded plastic, as is frequently the case where spectacles with a plastic frame are concerned. FIG. 3 shows such an application case. The spectacle frame 7 which is made of plastic 7 and holds the spectacle lenses, forms the moulded article 1 with the plug-in receiving means 3, into which engages the engaging end 4 of the metallic cheek 8 which thus represents the bridge 2 for the plug-in connection according to FIGS. 1 and 2. The cheek 8, which carries the one part of a side joint 9 and whose other part (shown with the dot-dash line) belongs to the spectacle side 10, can therefore be connected with the frame 7 after the injection-moulding of the same by inserting the engaging end 4 into the plug-in receiving means 3.

Figure 4:
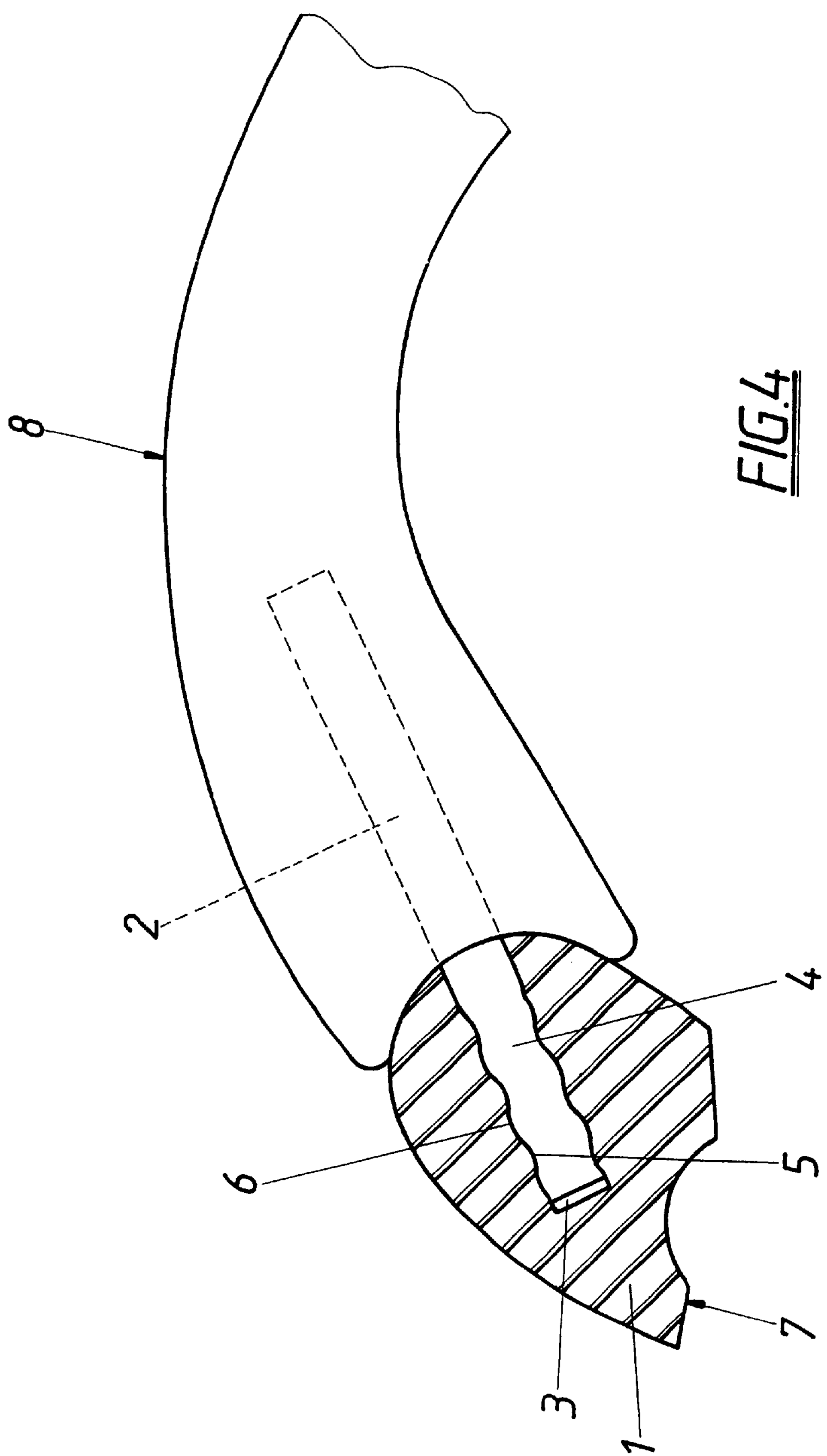
FIG. 4 shows the connection of a plastic cheek with a plastic frame of a spectacle by way of a metallic bridge injection-moulded into the cheek.

According to FIG. 4, a cheek 8 made of plastic is to be connected with the plastic spectacle frame 7 by a metallic bridge 2 which is injection-moulded into the cheek 8, with the engaging end 4 of said bridge projecting beyond the cheek 8, which as a result allows a subsequent connection of the cheek 8 with the frame 7 by a mere insertion of the bridge 2 into the plug-in receiving means 3 of the spectacle frame 7.

Figure 5:
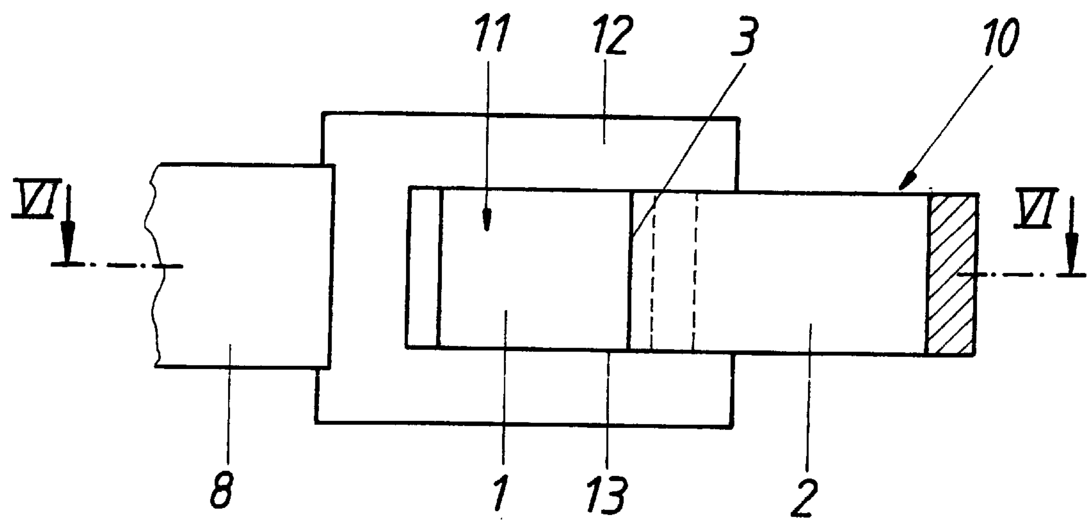
FIG. 5 shows in a simplified side view of a spectacle side joint with a wire side shaft connected by way of a connection in accordance with the invention.
Figure 6:
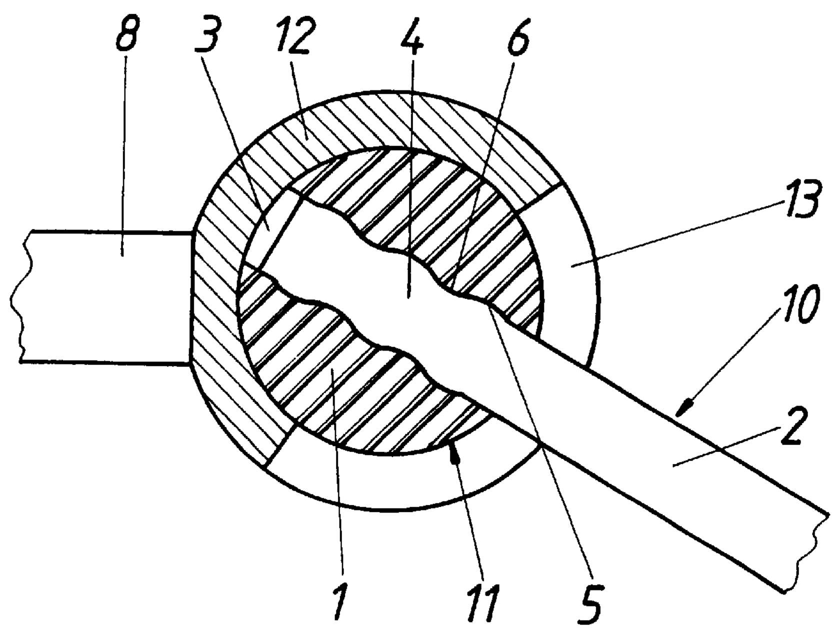
FIG. 6 shows a sectional view along the line VI—VI of FIG. 5.

According to FIGS. 5 and 6 it is possible, with the help of the plug-in connection in accordance with the invention, to realize new constructions which would otherwise not be possible. The side joint as illustrated in FIGS. 5 and 6 is formed by a cylindrical joint body 11 which is rotatably held in a bearing bush 12 arranged on a cheek 8. The wire side shaft 10 engaging through a circumferential shaft 13 of the bearing bush 12 into the cylindrical joint body 11. In a conventional way it would be necessary that the side shaft 10 with the joint body 11 would have to be connected prior to the insertion of the joint body 11 into the bearing bush 12. As a result, the bearing bush 12 would be provided with a single leadthrough opening for the side shaft 10 which leads to the circumferential slot 13 in order to enable the insertion of the bearing body 11 with the side shaft 10 into the bearing bush 12. If the bearing body 11 is arranged as a moulded article 1 of a plug-in connection according to FIGS. 1 and 2, the side shaft 10 can form an engaging end 4 which is provided with a snap-in profiling 5 which can be inserted into the plug-in receiving means 3 of the joint body 11 through the circumferential slot 13 in order to produce the plug-in connection after the insertion of the joint body 11 into the bearing bush 12, which allows omitting an axial leadthrough opening for the side shaft 10 in bearing bush 12.

What is claimed is:

1. A positive-locking connection between a metallic bridge (2) and a moulded article (1) which is injection-moulded from plastic, in particular for spectacles, with one end (4) of the bridge (2) engaging into the moulded article (1), characterized in that the moulded article (1) forms a plug-in receiving means (3) for the engaging end (4) of the bridge (2), which end is provided with a wave-like snap-in profiling (5) and can be inserted into the plug-in receiving means (3) under a substantially elastic deformation of a wall profiling (6) of said receiving means (3) which is shaped according to the snap-in profiling (5) of the bridge end (4).

2. A positive-locking connection as claimed in claim 1, characterized in that the snap-in profiling (5) of the engaging end (4) of the bridge (2) consists of an undulation of mutually opposite bridge surfaces.

3. A positive-locking connection as claimed in claim 2, characterized in that the undulation of the bridge surfaces extends symmetrically with respect to a central plane of the bridge (2).

4. A positive-locking connection as claimed in claim 2, characterized in that the engaging end (4) of the bridge (2) is bent back and forth in a wave-like manner in order to form the snap-in profiling (5).

5. A spectacle side joint with a positive-locking connection as claimed in claim 1 between a wire side shaft and a cylindrical joint body which is rotatably held in a bearing bush which is penetrated by a wire shaft in a circumferential slot, characterized in that the bearing body (11) which is made as a moulded article (1) from injection-moulded plastic forms the plug-in receiving means (3) for the engaging end (4) of the wire shaft (10) which is provided with the snap-in profiling (5) and can be inserted through the circumferential slot (13) of the bearing bush (12) into the plug-in receiving means (3) of the bearing body (11).

6. A method of producing a positive-locking connection between an end of a metallic bridge and a moulded article forming a plug-in receiving means for the metallic bridge end, which comprises the steps of (a) injection-moulding a plastic in a mould comprising a core having the shape of the metallic bridge end for the plug-in receiving means, (b) curing the moulded plastic in the mould to produce the moulded article, (c) removing the cured moulded article from the mould, (d) pulling the core out of the cured moulded article under elastic deformation of the wall of the plug-in receiving means formed by the core, and (e) plugging the metallic bridge end into the receiving means.

* * * * *